United States Patent
Antonaitis et al.

(10) Patent No.: US 6,181,744 B1
(45) Date of Patent: Jan. 30, 2001

(54) METHOD AND SYSTEM FOR IMPROVING PROCESS SHADOW TIME WITHIN A PULSED SIGNAL PROCESSING SYSTEM

(75) Inventors: David John Antonaitis, Endicott; Chad Matthew Showers, Cando; Justin Derek Smith, Endicott, all of NY (US)

(73) Assignee: Lockheed Martin Corporation, Bethesda, MD (US)

( * ) Notice: Under 35 U.S.C. 154(b), the term of this patent shall be extended for 0 days.

(21) Appl. No.: 09/014,793

(22) Filed: Jan. 28, 1998

(51) Int. Cl.[7] ....................................... H04B 1/66
(52) U.S. Cl. ...................... 375/240.01; 375/316; 375/350
(58) Field of Search .................... 375/316, 240, 375/240.01, 240.23, 350; 342/91, 101; 333/173

(56) References Cited

U.S. PATENT DOCUMENTS

| | | |
|---|---|---|
| 3,623,098 * | 11/1971 | Jones et al. ............................. 342/91 |
| 3,701,059 * | 10/1972 | Nyswander ............................ 333/173 |
| 3,767,939 | 10/1973 | Chamran et al. . |
| 3,898,573 | 8/1975 | Sherman . |
| 4,370,652 * | 1/1983 | Lucchi .................................. 342/101 |
| 4,481,675 | 11/1984 | Ichikawa et al. . |
| 4,739,189 | 4/1988 | Kellogg . |
| 4,857,778 | 8/1989 | Hague . |
| 5,324,999 | 6/1994 | Hunley et al. . |
| 5,418,409 | 5/1995 | Kuhn . |
| 5,463,346 | 10/1995 | Brooks . |
| 5,602,876 | 2/1997 | Noneman et al. . |

* cited by examiner

*Primary Examiner*—Don N. Vo
(74) *Attorney, Agent, or Firm*—Felsman, Bradley, Vaden, Gunter & Dillon, LLP

(57) ABSTRACT

A method and system for improving video shadow time within a pulsed signal processing system are disclosed. The pulsed signal processing system comprises a receiver, a digitizer, and a processor. The receiver generates video signals from radio-frequency signals collected by an attached antenna. The digitizer, coupled to the receiver, converts the video signals to digital signals. The digitizer further includes a bandwidth switch for reducing a shadow time of the video signals. Finally, the processor analyzes the digital signals in order to extract any useful information.

9 Claims, 4 Drawing Sheets

METHOD AND SYSTEM FOR IMPROVING PROCESS SHADOW TIME WITHIN A PULSED SIGNAL PROCESSING SYSTEM

BACKGROUND OF THE INVENTION

1. Technical Field

The present invention relates to a method and system for signal processing in general, and in particular to a method and system for processing pulsed signals. Still more particularly, the present invention relates to a method and system for improving process shadow time within a pulsed signal processing system.

2. Description of the Prior Art

In military defense, once a new weapon is developed, typically another weapon will be invented to counteract the first weapon. For example, since the introduction of radar in World War II, many different strategies have been developed to interfere with and to defeat radar effectiveness. These strategies are often referred to as electronic countermeasures (ECMs). Some successfully developed ECMs that have been popularized over the years to inhibit radar effectiveness include, inter alia, chaffs and jammers.

But with the improvement of radar technology and the increasing complexity of the electronic signal environment, not only are there more radars in operations today, the radar signals themselves are also more sophisticated than their predecessors. Not surprisingly, more sophisticated ECMs have been developed as a result. For example, an electronic warfare receiver, commonly referred to as an intercept receiver, has been developed to detect the existence of radar signals from a hostile source. Even so, because detailed information about the radar system from a hostile source is seldom available, it is almost impossible to design an intercept receiver as effective as the radar receiver in the radar system. Fortunately, due to the fact that the distance travelled by the radar signal from the radar system source to the intercept receiver is half the distance from the same radar system source to the radar receiver, the signal strength at the input of the intercept receiver is much stronger than the signal strength at the radar receiver. Therefore, if an intercept receiver is properly designed, the intercept receiver can effectively detect the radar signal from a hostile source.

Generally speaking, an intercept receiver is a pulsed signal processing system. A pulsed signal processing system processes each radar signal pulse as the radar signal pulse is being detected. The timeframe after a radar signal pulse detection in which the pulsed signal processing system cannot (or is not ready) to detect another radar signal pulse is referred to as "shadow time." One main drawback of prior art pulsed signal processing systems is that these pulsed signal processing systems must wait for a long period of time for the radar signal level to decay below the system threshold level in order to process a subsequent pulse, even though the radar signal may have already ended. In other words, these pulsed signal processing systems have a very long process shadow time. With a very long process shadow time, any of the following problems can occur: (1) system processing throughput is limited by the incapability to handle dense pulsed signal environments; (2) pulse signals that occur within the process shadow time of a previous pulse signal will go undetected; and (3) pulse signal widths will be measured inaccurately when portions of the pulse signal fall within the process shadow time of a previous pulse signal. Consequently, it would be desirable to provide a method to improve process shadow time within a pulsed signal processing system.

SUMMARY OF THE INVENTION

In view of the foregoing, it is therefore an object of the present invention to provide an improved method and system for signal processing.

It is another object of the present invention to provide an improved method and system for processing pulsed signals.

It is yet another object of the present invention to provide an improved method and system for improving process shadow time within a pulsed signal processing system.

In accordance with a preferred embodiment of the present invention, an electrical signal receiving system comprises a receiver, a digitizer, and a processor. The receiver generates video signals from radio-frequency signals collected by an attached antenna. The digitizer, coupled to the receiver, converts the video signals to digital signals. The digitizer includes a bandwidth switch for reducing a shadow time of the video signals. Finally, the processor analyzes the digital signals in order to extract any useful information.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention is applicable in a variety of electrical signal receiving systems. Although an electronic warfare receiver, such as an intercept receiver for providing interference to hostile radars, is utilized to illustrate a preferred embodiment of the present invention, it should be understood by those who are skilled in the relevant art that the present invention may also be applicable to any electrical signal receiving system mainly intended for non-military use, such as a television set or a radio.

Figure 1:
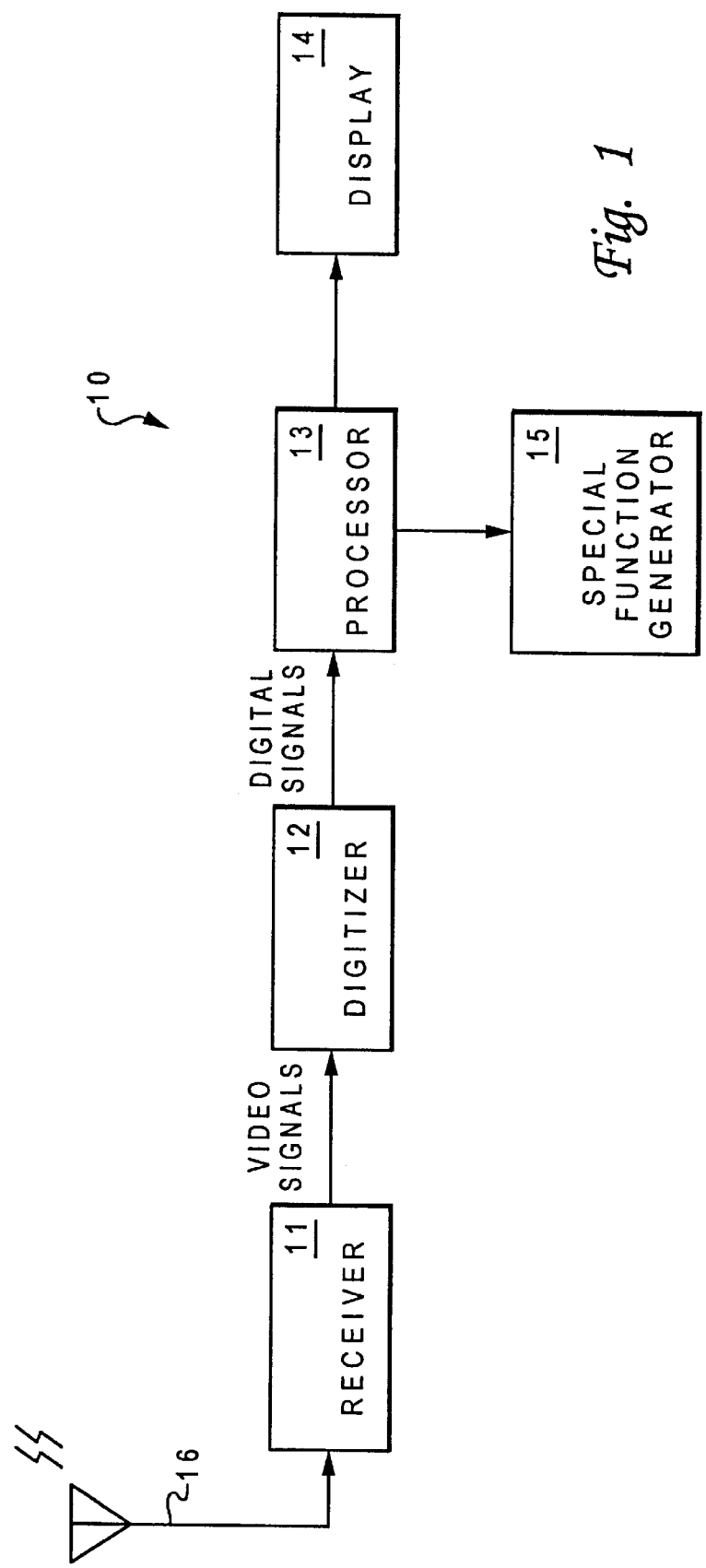
FIG. 1 is a block diagram of an electrical signal receiving system in which a preferred embodiment of the present invention may be employed.

Referring now to the drawings and in particular to FIG. 1, there is depicted a block diagram of an electrical signal receiving system in which a preferred embodiment of the present invention may be employed. As shown, an electrical signal receiving system 10 includes an antenna 16, a receiver 11, a digitizer 12, a processor 13, a display unit 14, and a special function generator 15. During operation, antenna 16 collects various electromagnetic energies from free space and feeds them to receiver 11. For the present invention, the electromagnetic energy of interest is typically radio-frequency (RF) signals. After receiving the RF signals, receiver 11 then generates some signal outputs, such as video signal outputs, based on the RF signals. These signal outputs are subsequently converted to digital information by digitizer 12. Processor 13 analyzes the digital information originally generated by receiver 11 to extract any useful information. Display unit 14 then presents this information in a visual form (sometimes, in an audio form also) to an operator standing-by. In addition, processor 13 may also control special function generator 15 to take certain actions automatically, such as turning on jammers for providing interferences to hostile radars.

According to its operating frequency, receiver 11 can be classified as a very high frequency (VHF) receiver, an ultrahigh frequency (UHF) receiver, a microwave receiver, or an extremely high frequency (EHF) receiver. Otherwise, receiver 11 may simply be classified under either one of the two broad groups, namely, a communication intercept receiver or a radar intercept receiver, depending on the frequency range receiver 11 covers. Also, although digitizer 12 is shown as a separate unit in FIG. 1, digitizer 12 can be considered as part of receiver 11 or as part of processor 13.

Figure 2:
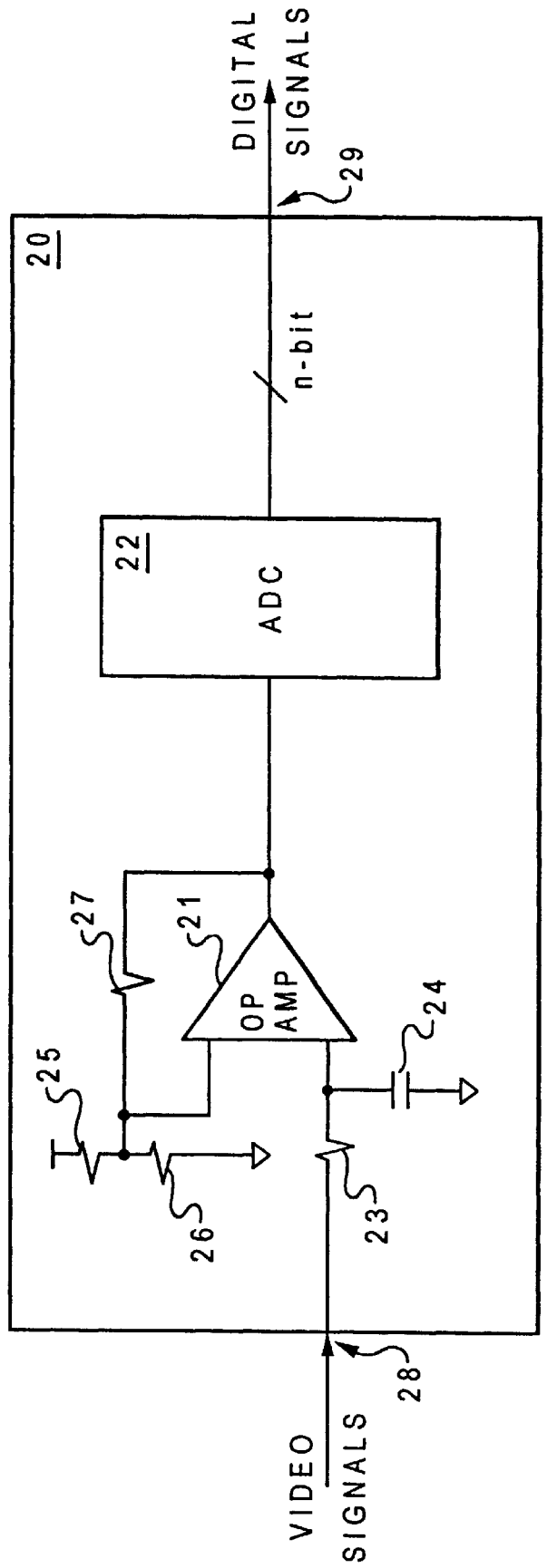
FIG. 2 is a detailed block diagram of a digitizer according to the prior art.

With reference now to FIG. 2, there is depicted a detailed block diagram of a digitizer according to the prior art. Digitizer 20 includes an operational amplifier 21 and an analog-to-digital convertor (ADC) 22. Resistors 25, 26, and 27 provide the necessary voltage biasing and feedback for operational amplifier 21. In addition, a resistor 23 and a capacitor 24 together act as a lowpass filter for receiving incoming video signals. Video signals from the receiver (see FIG. 1) are input at a video signal input 28. After obtaining the required amplitude gain from operational amplifier 21, the video signals are then passed to ADC 22 for digitization. The digitized video signals are finally sent out via digital signal output 29 to the processor (see FIG. 1) for analysis.

One of the many drawbacks of digitizer 20 is that the bandwidth of digitizer 20 is constant and cannot be changed. This actual bandwidth is set by resistor 23 and capacitor 24. As a result, the electrical signal receiving system is incapable of handling dense pulse signal environments. Furthermore, when portions of a pulse signal fall within a process shadow time of an immediately precedent pulse signal, inaccurate pulse-width measurements may occur.

Figure 3:
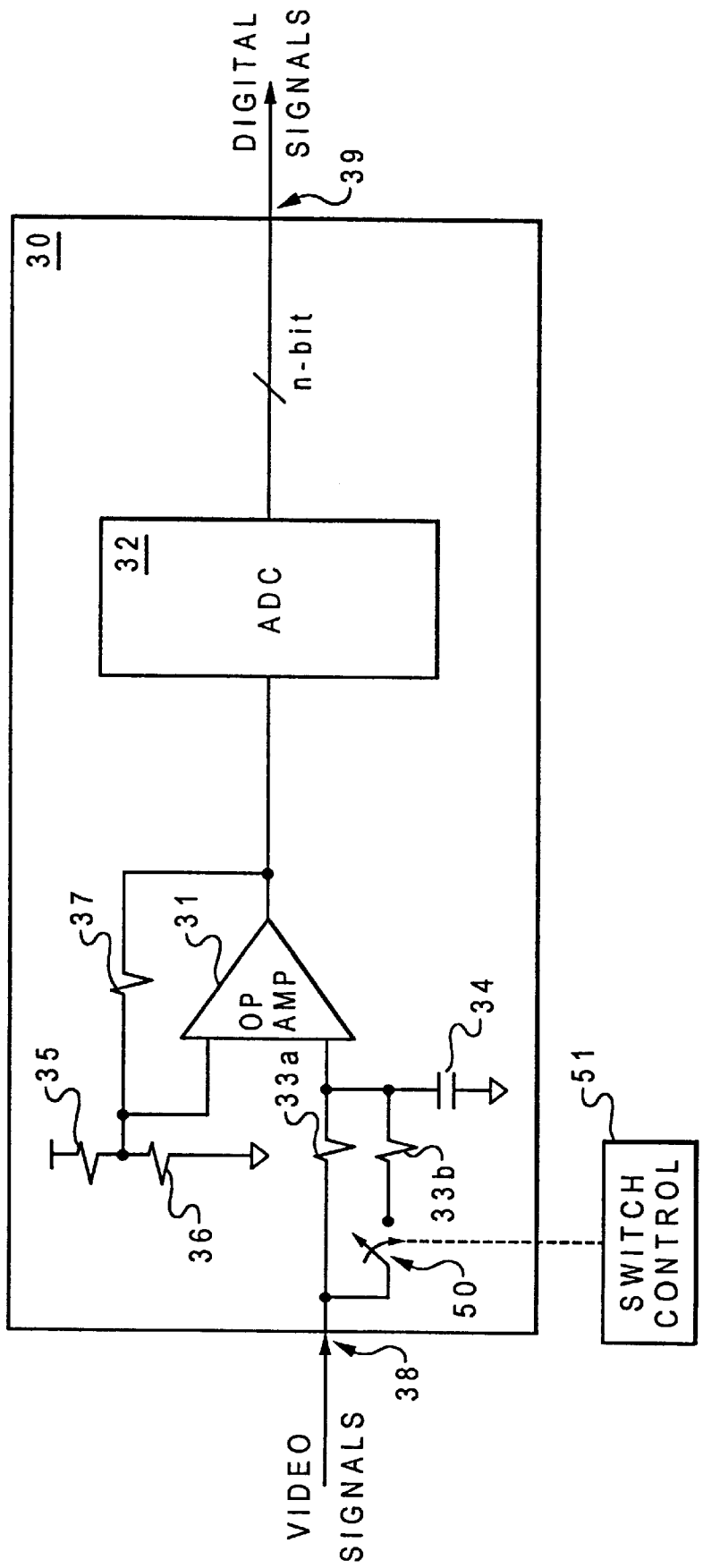
FIG. 3 is a detailed block diagram of a digitizer, in accordance with a preferred embodiment of the present invention.

Referring now to FIG. 3, there is depicted a detailed block diagram of a digitizer in accordance with a preferred embodiment of the present invention. As shown, digitizer 30 includes an operational amplifier 31 and an analog-to-digital convertor (ADC) 32. Similar to digitizer 20 of FIG. 2, resistors 35, 36, and 37 provide the necessary voltage biasing and feedback for operational amplifier 31. However, departing from digitizer 20 of FIG. 2, digitizer 30 provides two resistors a bandwidth controlling resistor 33a and a bandwidth controlling resistor 33b, along with a capacitor 34 to be the lowpass filter for receiving incoming video signals. One or both bandwidth controlling resistors 33a and 33b can be selectively chosen via a bandwidth switch 50 along with a switch control 51.

When bandwidth switch 50 is in an open position as presently shown in FIG. 3, video signals from the receiver (see FIG. 1) are passed from a video signal input 38 to operational amplifier 31 via bandwidth controlling resistor 33a alone. Otherwise, when bandwidth switch 50 is in a closed position (not shown), video signals from the receiver are passed from a video signal input 38 to operational amplifier 31 via bandwidth controlling resistor 33a and bandwidth controlling resistor 33b. In essence, when bandwidth switch 50 is in a closed position, both bandwidth controlling resistors 33a and 33b are connected in a parallel fashion such that the total resistance is reduced, as well known in the art. For example, if the resistance of bandwidth controlling resistor 33a is approximately 100Ω and the resistance of bandwidth controlling resistor 33b is also approximately 100Ω, then, the total resistance of bandwidth controlling resistors 33a and 33b when bandwidth switch 50 is in a closed position is approximately 50Ω.

Regardless of the position of bandwidth switch 50, after obtaining the required amplitude gain from operational amplifier 31, the video signals are then passed to ADC 32 for digitization. The digitized video signals are finally sent out via digital signals output 39 to the processor (see FIG. 1) for analysis.

As a preferred embodiment of the present invention, bandwidth switch 50 is closed when a plateau of a detected video pulse signal is reached. One implementation of a signal plateau detection circuit includes a sample-and-hold circuit a peak detector, and a counter. Once a video pulse signal amplitude has reached a peak value for an extensive amount of time, it is highly likely that a plateau of this video pulse signal has been reached. Accordingly, the sample and hold circuit, the peak detector, and the counter may be utilized to provide such determination, as is well known to those skilled in the relevant art.

In an alternative embodiment of the present invention, bandwidth switch 50 is closed when a predetermined time has lapsed after the video pulse signal detection. Basically, this predetermined time dictates the sensitivity of the entire electrical signal receiving system.

Figure 4A:
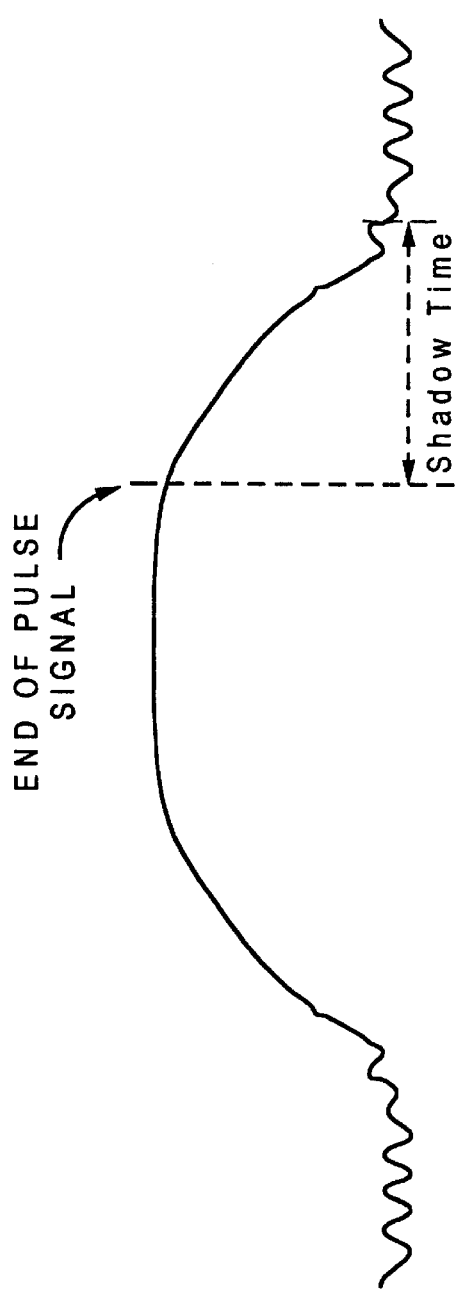
FIGS. 4a and 4b are two plots of video pulses provided by a fixed-bandwidth digitizer and a switching-bandwidth digitizer, respectively.
Figure 4B:
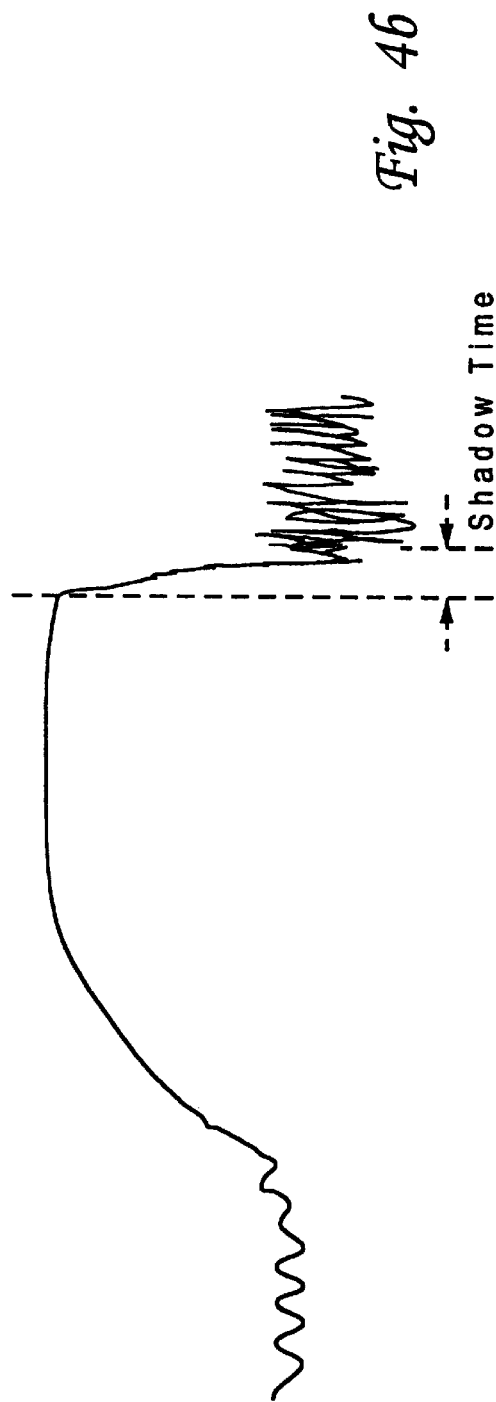

With reference now to FIGS. 4a and 4b, there are illustrated two plots of video pulses provided by a fixed-bandwidth digitizer and a switching-bandwidth digitizer, respectively. The video pulse signal plot in FIG. 4a is taken at the output of operational amplifier 21 of FIG. 2. Because the bandwidth of the lowpass filter in FIG. 2 is fixed and is typically narrow, the shadow time of the corresponding video output from operational amplifier 21 is very long. The video pulse signal plot in FIG. 4b is taken at the output of operational amplifier 31 of FIG. 3. Because the bandwidth of the lowpass filter in FIG. 2 is adjustable, the shadow time can be shortened by switching bandwidth switch 50 to a closed position once the plateau of the video pulse signal has been reached.

As has been described, the present invention provides an improved method for improving process shadow time within a pulsed signal processing system. According to the present invention, during the processing of a pulse signal, a narrow bandwidth is utilized to obtain accurate measurements; but as the pulse signal starts to drop, a wider bandwidth is switched in to rapidly decay the pulse signal below a threshold so that the pulsed signal processing system is ready to detect another pulse signal. By increasing the bandwidth at the end of a pulse signal, the process shadow time (or video decay) is drastically decreased. With this improvement, the performance of the entire pulse signal processing system is enhanced in two ways—the pulse-width measurement is more accurate and the system is able to operate in dense pulse signal environments.

While the invention has been particularly shown and described with reference to a preferred embodiment, it will be understood by those skilled in the art that various changes in form and detail may be made therein without departing from the spirit and scope of the invention.

What is claimed is:

1. A pulsed signal processing system, comprising:
   a receiver having an antenna for generating analog signals from radio-frequency signals collected by said antenna;

a digitizer, coupled to said receiver, for converting said analog signals to digital signals, wherein said digitizer includes a bandwith switching means for reducing a shadow time of said analog signals by increasing a bandwidth of said digitizer, wherein said bandwidth switching means includes a switch control that toggles between a first configuration for limiting the bandwidth of said digitizer before said analog signals reach a plateau and a second configuration for increasing the bandwidth of said digitizer after said analog signals have reached said plateau; and a processor, coupled to said digitizer, for analyzing said digital signals to extract any useful information.

2. The pulsed signal processing system according to claim 1, wherein said first configuration is provided by a low-pass filter having a first bandwidth and said second configuration is provided by said low-pass filter having a bandwidth higher than said first bandwidth.

3. The pulsed signal processing system according to claim 1, wherein said first configuration is provided by a low-pass filter having a capacitor and a resistor, and said second configuration is provided by said low-pass filter having said capacitor and two resistors connected in parallel.

4. A method for improving process video shadow time within a pulsed signal processing system, wherein said pulsed signal processing system includes a receiver, a digitizer, and a processor, said method comprising the steps of:

generating analog signals from received radio-frequency signals by said receiver;

maintaining a first configuration to limit a bandwidth of said digitizer before said analog signals reach a plateau;

switching to a second configuration to increase said bandwidth of said digitizer for reducing a shadow time of said analog signals after said analog signals have reached said plateau; and analyzing said digital signal to extract any useful information by said processor.

5. The method according to claim 4, wherein said analog signals are video analog signals.

6. The method according to claim 4, wherein said first configuration is provided by a low-pass filter having a first bandwidth and said second configuration is provided by said low-pass filter having a bandwidth higher than said first bandwidth.

7. A method for improving process video shadow time within a pulsed signal processing system, wherein said pulsed signal processing system includes a receiver, a digitizer, and a processor, said method comprising the steps of:

generating analog signals from received radio-frequency signals by said receiver;

maintaining a first configuration to limit a bandwidth of said digitizer before a predetermined time is lapsed;

switching to a second configuration to increase said bandwidth of said digitizer for reducing a shadow time of said analog signals after said predetermined time has been lapsed; and analyzing said digital signal to extract any useful information by said processor.

8. The method according to claim 7, wherein said analog signals are analog video signals.

9. The method according to claim 7, wherein said first configuration is provided by a low-pass filter having a first bandwidth and said second configuration is provided by said low-pass filter having a bandwidth higher than said first bandwidth.

* * * * *

UNITED STATES PATENT AND TRADEMARK OFFICE
CERTIFICATE OF CORRECTION

PATENT NO.     : 6,181,744 B1
DATED          : January 30, 2001
INVENTOR(S)    : Antonaitis et al.

It is certified that error appears in the above-identified patent and that said Letters Patent is hereby corrected as shown below:

Column 3,
Line 49, delete "two resistors a bandwidth controlling resistor 33a and a" and replace it with -- two resistors -- a bandwidth controlling 33a and a --.

Column 4,
Line 17, add a comma after the word "circuit".

Signed and Sealed this

Seventh Day of May, 2002

Attest:

Attesting Officer

JAMES E. ROGAN
Director of the United States Patent and Trademark Office